United States Patent [19]
Fugleberg

[11] Patent Number: 5,199,974
[45] Date of Patent: Apr. 6, 1993

[54] METHOD FOR RECOVERING METAL CONTENTS OF METALLURGIC WASTE PRECIPITATES OR WASTE DUSTS BY SUSPENSION SMELTING

[75] Inventor: Sigmund P. Fugleberg, Turku, Finland

[73] Assignee: Outokumpu Research Oy, Pori, Finland

[21] Appl. No.: 826,118

[22] Filed: Jan. 27, 1992

[30] Foreign Application Priority Data

Feb. 13, 1991 [FI] Finland .................................. 910692

[51] Int. Cl.$^5$ ............................................. C22B 7/00
[52] U.S. Cl. ....................................................... 75/659
[58] Field of Search ........................................... 75/659

[56] References Cited

U.S. PATENT DOCUMENTS

3,298,825  1/1967  Lange ..................................... 75/659
3,414,401  12/1968  Fourt ..................................... 75/659

Primary Examiner—Peter D. Rosenberg
Attorney, Agent, or Firm—McAulay Fisher Nissen Goldberg & Kiel

[57] ABSTRACT

The present invention relates to a method for recovering valuable metals contained in various metallurgic waste precipitates and dusts, and also to a method for forming of the rest of the waste precipitate or dust a slightly soluble product suited for further processing. The recovery of valuable metals and the forming of slightly soluble products is carried out in a suspension smelting furnace, in which case the smelting of the precipitates and dusts is mainly reducing.

20 Claims, No Drawings

METHOD FOR RECOVERING METAL CONTENTS OF METALLURGIC WASTE PRECIPITATES OR WASTE DUSTS BY SUSPENSION SMELTING

The present invention relates to a method for recovering valuable metals contained in various metallurgic waste precipitates or dusts, and at the same time to a method for forming of the rest of the waste precipitate or dust a slightly soluble product suited for further use. The recovery of valuable metals and the formation from a slightly soluble product is carried out in a suspension smelting furnace, in which case the smelting of precipitates and dusts is mainly reduces.

Metallurgic waste precipitates and dusts often contain volatile metals, such as zinc and lead. On the other hand, the waste often contains a good amount of iron as a useless waste component. In a finely powdered precipitate or dust, the metals are at least partly soluble owing to their large specific area. Generally the waste is non-combustible. As examples of this kind of precipitates, let us mention hydrometallurgic precipitates from zinc plants, such as jarosite, the intermediate product from neutralizing dissolution, goethite, impure hematite or the like, as well as filter dusts from steel plants.

When suspension smelting is applied to the treatment of a waste precipitate or dust, the volatile components are concentrated to flue dust, wherefrom they can be recovered by means of ordinary metal production processes. Iron remains in the slag, and because the slag is slightly soluble, it is harmless for the environment and can be used for instance for building purposes or sand blasting. The smelting of waste requires energy, wherefore the normal metallurgic, heat-producing suspension smelting technique cannot be applied, but all energy required for the smelting and volatilizing is brought from outside.

In the prior art there is known a method and apparatus, introduced in the U.S. Pat. Nos. 4,654,077 and 4,732,368, for smelting waste and slags. According to this method, the waste is smelted in a vertical two-part furnace, which has a steel structure and is cooled by water. To the upper part of the reactor, there is fed oxygen or oxygen-enriched air and fuel, which burns in this first zone of the reactor. The temperature of the first zone is over 2,000° C. The created flue dusts flow down to the next zone, to the top part whereof there is also conducted some oxidizing gas in order to increase turbulence. The feed to be smelted is then conducted into this second zone, where the flue gases entering from above heat the feed up, so that it is smelted, and valuable metals, such as zinc and lead, are volatilized. The diameter of the lower part of the furnace is larger than that of the upper combustion chamber, because the increase in the transversal area of the furnace space brings about an improved mixing of the feed with the hot gases. Both the gases, with which the volatilized metals are discharged, and the molten product are discharged through the bottom part of the furnace.

There are some drawbacks in the above described method and apparatus. Heat losses in the apparatus are significant, because, as is well known, a water-cooled furnace with a steel structure is not as economic as a brick lined furnace. Moreover, the above described two-stage process is not advantageous for heat economics, because the fuel is burned in the top part of the reactor, and what is more the temperature of the flue gases created in the burning must be sufficiently high in order to make the gases heat up and smelt the non-combustible feed fed into the second stage.

According to the present invention, there is now developed a method where non-combustible metallurgic waste and intermediate product material is smelted, in order to recover its valuable metal contents, in a flash smelting furnace and with suspension smelting technique, so that the material to be smelted and/or volatilized is fed into a flame formed by oxygen or oxygen-enriched air and fuel, for creating a good suspension. The essential novel features of the invention are apparent from the appended patent claims.

Often the decomposition and reducing reactions of a waste precipitate take place in several stages, as for example in the smelting of jarosite. The greatest heat demand is connected to the discharge of crystal water and ammonia, at the temperature 350–480° C. of the material, as well as to the decomposition of sulphates at the temperature 650–770° C. The heat demand of these reactions forms the major part of the whole amount of energy needed in the smelting. For instance in jarosite, iron and sulphur are present in their highest degrees of oxidation, and therefore the fuel used in the smelting must be burned in a reducing fashion (with an oxygen amount which is lower than stoichiometric amount) in order to reduce the iron into FeO and $Fe_3O_4$, and the sulphate into sulphur dioxide.

The volatilization of metals is controlled by adjusting the degree of oxidation in the furnace atmosphere. The volatilization of zinc and lead also required reducing conditions, which are created by using reducing combustion in the burners. The degree of reducing is easily adjusted by changing the fuel-oxygen ratio.

A condition set for valuable metal dusts produced in the treatment of waste precipitates is a minimal amount of mechanical dust, because the iron contained in mechanical dust increases the expenses of further treatment. Mechanical dust here means dust which is not evaporized in the furnace space, nor condensed thereafter.

On the arch of the reaction shaft of a flash smelting furnace, there are radially arranged several burners, through which fuel and oxygen are fed into the upper part of the reaction shaft. The employed fuel can be any suitable fuel, such as natural gas, oil, coal or coke, and the gas used in the burner can also be oxygen-enriched air instead of oxygen. The fuel and oxygen are ignited in the top part of the reaction shaft, and the finely porous feed is fed into this flame through a distributor.

In addition to mechanical waste precipitate or dust, the feed can also contain some siliceous flux, such as sand, in which case the created slag is siliceous. The employed flux can, in addition to or instead of sand, also be some partly or totally alkaline flux, such as lime. In that case the created slag is either olivine slag or calcium ferrite slag. Siliceous and olivine slag are practically non-soluble, and calcium ferrite slag is only slightly soluble.

The location of the burners, as well as their type (length of the created flame) is chosen so that in the flame there is created a suspension of the non-combustible feed and combustion gases, which suspension is optimal with respect to the shape of the reaction shaft, i.e. it does not reach the walls of the reaction shaft, and consequently the walls are not subjected to heavy heat strain. Owing to the location and type of the burners, the flame thus has impulse which effectively distributes the supplied non-combustible material. The smelting of the suspension also can be enhanced by feeding a small amount of the oxygen-fuel mixture through the small burner arranged inside the distributor.

In order to even out the temperature distribution, and likewise to even out the strain on the walls of the reaction shaft, a second set of burners is arranged on the shaft walls, which burners maintain a sufficient temperature lower down in the shaft. This, as well as the above described feeding of non-combustible material into the top part of the reaction shaft, directly into the combustion chamber, brings about a temperature profile which is remarkably smoother than the one mentioned in the description of the prior art. It is also proved advantageous to use a somewhat more reducing burning in the lower burners than in the burners located in the furnace cover.

According to the present invention, the temperature in the reaction shaft can be maintained evenly at 1,300–1,600° C., advantageously at about 1,400° C., in which case the non-combustible metal-bearing material is smelted, and the valuable metals are volatilized. When the furnace conditions are compared to the conditions prevailing in the above described processes of the prior art, it is maintained that in the method of the invention, the energy consumption is significantly more efficient than in the said processes, and that the maximum temperature in the furnace is even 500° C. lower, which respectively leads to smaller heat losses than in the methods of the prior art.

The iron of the feed is turned into slag and accumulated on the bottom of the settler, wherefrom it is tapped either to further treatment or into granulation, depending on the requirements set for the slag. One typical way of further treatment is fuming. By means of feeding flux, the slag composition can be adjusted in a desired fashion. An advantage of the settler is that the slag has time to settle in the furnace prior to tapping, and thus it is easier to regulate the slag composition towards the desired direction, depending on the further use in question.

The gases and dusts created in the reaction shaft are conducted, through the uptake shaft, into a waste heat boiler, where the gases are afterburned when necessary. In some cases the gases can also be burned in the settler. Part of the dust contained in the gas is separated in the boiler, and the rest is removed with an electrofilter. Owing to its high valuable metal content and low iron content, dust is suited as a feed in ordinary metal production processes.

The invention is further described with reference to the appended drawings:

EXAMPLE 1

In a series of experiments, jarosite was smelted in a pilot-scale flash smelting furnace; the composition of the jarosite in percentages by weight was:

| | | |
|---|---|---|
| Fe | 22.0–24.1% |
| $SO_4$ | 34.5–46.8% |
| $SiO_2$ | 4.7–6.6% |
| CaO | 1.6–3.3% |
| $Al_2O_3$ | 1.1–1.5% |
| Zn | 2.3–2.7% |
| Pb | 4.7–6.8% |

The energy for smelting was produced by burning butane by means of oxygen. The employed flux was sand, which is advantageous with respect to further uses of the slag. Siliceous slag is extremely slightly soluble, in acidic conditions significantly less soluble than oxidic slag. As a product from the smeltings, there was obtained iron silicate slag, the zinc and lead contents whereof could be fluctuated within a large range by adjusting the oxygen pressure of the furnace; there was also obtained dust with high zinc and lead contents.

The gas phase of the furnace was maintained reducing by burning the butane with lower than stoichiometric amount of oxygen, which is a requirement for the volatilization of zinc and lead. The $CO_2/CO$ ratio of the combustion gases in the reaction shaft fluctuated within the range 2.7–70, mainly, however, within 4.5–20. In the furnace outlet, the $CO_2/CO$-ratio was 3.6–75, mostly between 6–30. The gas temperature in the reaction shaft was 1,400–1,570° C., and the corresponding temperature of the melt in the settler was 1,360–1,480° C.

In the pilot tests, the energy balance of the flash smelting furnace was as follows:

| | |
|---|---|
| out with slag and dust | 696–732 MJ/h |
| out with gas | 2,175–2,422 MJ/h |
| heat demand of reactions | 1,800–1,935 MJ/h |
| heat losses | 1,490–1,570 MJ/h |

In commercial scale the relative portion of heat losses in the total demand of energy is naturally significantly reduced, to about 10–15% of the thermal balance.

The product analyses varied within the following ranges:

| | | |
|---|---|---|
| Slag: | | |
| Fe | 31.0–46.2% | |
| $Fe_3O_4$ | 17.4–44.7% | (by using the Satmagan method) |
| S | <0.01–0.16% | |
| $SiO_2$ | 20.0–28.8% | |
| CaO | 2.9–5.4% | |
| $Al_2O_3$ | 2.6–3.2% | |
| Zn | 1.0–2.5% | |
| Pb | 0.6–4.2% | |
| Electrofilter dust: | | |
| Fe | 10.3–28.5% | |
| S | 3.4–12.9% | |
| $SiO_2$ | 1.8–7.1% | |
| CaO | 1.0–2.8% | |
| $Al_2O_3$ | 0.6–1.5% | |
| Zn | 3.9–13.2% | |
| Pb | 23.1–41.9% | |

The recoveries of volatile metals into the dust were: Zn 54.2–77.9% and Pb 74.9–93.8%. As was maintained above, the degree of volatilization can be adjusted by the oxygen pressure of the furnace, and the recover also depends on the contents of the original material.

The recoveries of non-volatile components into the slag were: Fe 82.0–87.2%, $SiO_2$ 92.6–94.4%, CaO 85.0–91.2% and $Al_2O_3$ 89.2–91.8%. The dust formation of these components, and their consequent recovery into the slag is strongly dependent on the degree of fineness of the feed, wherefore direct comparisons between the various feed materials cannot be made.

The above described smelting experiments were carried out in a pilot flash smelting furnace with a feed capacity of 650–1000 kg/h in this case. The amount of smelted jarosite was about 280 tons. The employed flux was sand, 20 tons altogether. The adding of zinc concentrate into the feed was also tested with an experimental batch of over 5 tons. About 130 tons of slag and 38 tons of dusts were produced in these tests.

As a result of this experiment, it is concluded that the use of energy was efficient, because the operations were clearly carried out at temperatures lower than for example those of the prior art. The $CO_2/CO$ ratio of the combustion gases was high, and the degree of utilization of the burning heat was likewise high.

EXAMPLE 2

In another series of experiments, jarosite and waste lime were smelted with sand in a model-scale flash smelting furnace with a feeding capacity of 60–100 kg/h for this kind of raw materials.

The analyses of the materials used in the experiments in percentages by weight were:

|  | yarosite | gypsum + sand |
|---|---|---|
| Fe | 22.4 | 1.3 |
| $SO_4$ | 37.2 | 9.4 |
| $SiO_2$ | 8.6 | 34.4 |
| CaO | 2.8 | 21.2 |
| $Al_2O_3$ | 1.8 | 2.1 |
| Zn | 2.4 | 4.7 |
| Pb | 5.5 | 0.2 |

The smelting was carried out by using the energy produced by butane-oxygen burners. The average feed of raw materials in this series of experiments was 65.5 kg/h in all, and the consumption of butane in the reaction shaft was 12.6 kg/h. The temperature in the shaft was 1.330–1.430° C.

The analysis of the olivine slag produced in the experiments was

| Fe | 33.9–42.5% |
|---|---|
| $Fe_3O_4$ | 13.5–34.6% |
| S | 0.02–0.58 |
| $SiO_2$ | 19.1–24.8% |
| CaO | 5.9–10.7% |
| $Al_2O_3$ | 2.6–3.9% |
| Zn | 1.0–2.7% |
| Pb | 0.24–3.1% |

The recoveries of non-volatile components into the slag were 90.3–99.5%.

The analysis of the produced dust was:

| Fe | 8.4–18.0% |
|---|---|
| S | 4.5–10.7% |
| $SiO_2$ | 1.9–4.3% |
| CaO | 5.3–16.0% |
| $Al_2O_3$ | 0.6–1.4% |
| Zn | 7.2–16.3% |
| Pb | 14.3–35.0% |

The recoveries into dust were, depending on the oxygen pressure: Zn 44–80% and Pb 63–93%.

As was seen from the analyses, the results conform to those from the pilot-scale experiments.

I claim:

1. A method for recovering the valuable metal contents of non-combustible metallurgic waste precipitates, dusts and intermediate products, as well as for producing soluble slag, comprising the steps of:
    feeding combustion gas and fuel through one set of burners into an upper part of a reaction shaft of a flash smelting furnace, radially from the arch of the furnace for creating a flame;
    feeding non-combustible divided metallurgic waste or intermediate product into the flame in order to create a suspension;
    feeding fuel and oxygen into the shaft through another set of burners arranged on the shaft walls for maintaining a smooth temperature profile in the reaction shaft;
    carrying out the smelting in reducing conditions so that the valuable metals volatilized in the reaction shaft are removed, along with gases, through the uptake shaft; and
    tapping created iron-containing slag from the settler.
2. The method of claim 1, wherein the temperature in the reaction shaft is 1.300–1.600° C.
3. The method of claim 1, wherein the combustion gas is oxygen or oxygen-enriched air.
4. The method of claim 1, wherein the metallurgic waste precipitate or intermediate product is the waste precipitate or intermediate product of hydrometallurgic zinc.
5. The method of claim 1 wherein the waste precipitate is jarosite.
6. The method of claim 1 wherein the waste precipitate is hematite.
7. The method of claim 1 wherein the waste precipitate is goethite.
8. The method of claim 1 wherein the waste precipitate is an intermediate product from neutralizing dissolution.
9. The method of claim 1, wherein flux is fed into the reaction shaft of the flash smelting furnace.
10. The method of claim 1 or 10, wherein the flux is siliceous.
11. The method of claim 1 or 10, wherein the flux is alkaline.
12. The method of claim 1 wherein both siliceous and alkaline materials are employed as flux.
13. The method of claim 4, wherein the waste precipitate is jarosite.
14. The method of claim 4, wherein the waste precipitate is hematite.
15. The method of claim 4, wherein the waste precipitate is goethite.
16. A method for recovering metals from metallurgic waste precipitates or dusts in a flash smelting furnace and with suspension smelting technique for reducing precipitates or dusts smelted, comprising;
    feeding fuel and combustion gas through burners associated with the arch of the reaction shaft of said flash smelting furnace for feeding the fuel and combustion gas into the upper part of the reaction shaft;
    igniting the fuel and combustion gas in the top part of the reaction shaft to form a flame and feeding the finely porous feed into the flame through a distributor;
    feeding fuel and combustion gas through burners associated with the shaft walls for maintaining a sufficient temperature lower down in the shaft to even out the temperature distribution and even out the strain of the reaction shaft;
    using reducing conditions in the burners to control the volatization of metals by changing the fuel-combustion gas ratio to control and adjust the degree of oxidation in the furnace atmosphere;

conducting gases and dust created in the reaction shaft through the uptake shaft into a waste heat boiler; and tapping the iron created slag from the settler.

17. The method of claim 16, including feeding a small amount of the combustion gas-fuel mixture through a small burner inside of said distributor.

18. The method of claim 16, including maintaining the temperature in the reaction shaft at about 1400° C.

19. The method of claim 16, including tapping the iron of the feed turned into slag and accumulated on the bottom of the settler.

20. The method of claim 16, wherein the smelting of jarosite decomposition and reducing reactions of a waste precipitate requires burning of the fuel in a reducing fashion because of the presence of iron and sulphur in their highest degrees of oxidation, comprising:

burning the fuel in a reducing fashion with an oxygen content which is lower than the stoichiometric amount to reduce the iron into FeO and $Fe_3O_4$ and the sulphur into sulphur dioxide.

* * * * *